US 6,578,520 B2

(12) United States Patent
Otsuji et al.

(10) Patent No.: US 6,578,520 B2
(45) Date of Patent: Jun. 17, 2003

(54) ABSORBENT MAT FOR EXCRETA TREATMENT

(75) Inventors: Kazuya Otsuji, Tochigi (JP); Yasuki Tsutsumi, Tochigi (JP); Hiromi Yamaguchi, Tochigi (JP); Nobuya Sato, Tochigi (JP)

(73) Assignee: Kao Corporation, Tokyo (JP)

(*) Notice: Subject to any disclaimer, the term of this patent is extended or adjusted under 35 U.S.C. 154(b) by 0 days.

(21) Appl. No.: 09/758,418

(22) Filed: Jan. 12, 2001

(65) Prior Publication Data

US 2001/0009142 A1 Jul. 26, 2001

(30) Foreign Application Priority Data

| Jan. 14, 2000 | (JP) | 2000-005440 |
| Aug. 1, 2000 | (JP) | 2000-233448 |
| Sep. 19, 2000 | (JP) | 2000-283174 |
| Nov. 15, 2000 | (JP) | 2000-348550 |

(51) Int. Cl.$^7$ .................................................. A01K 29/00
(52) U.S. Cl. .......................................................... 119/165
(58) Field of Search .................................. 119/165, 166, 119/167, 168, 169, 170

(56) References Cited

U.S. PATENT DOCUMENTS

| 4,494,482 A | | 1/1985 | Arnold | |
| 4,935,276 A | * | 6/1990 | Pawlowski et al. | 428/35.7 |
| 5,038,721 A | | 8/1991 | Ouellette et al. | |
| 5,193,488 A | * | 3/1993 | Walton | 119/166 |
| 5,482,007 A | * | 1/1996 | Kumlin | 119/169 |
| 5,543,215 A | * | 8/1996 | Hansen et al. | 428/378 |
| 5,609,727 A | * | 3/1997 | Hansen et al. | 162/158 |
| 5,630,376 A | * | 5/1997 | Ochi et al. | 119/169 |
| 5,730,737 A | | 3/1998 | Widlund et al. | |
| 5,819,688 A | * | 10/1998 | Walker | 119/169 |
| 5,877,097 A | | 3/1999 | West et al. | |

FOREIGN PATENT DOCUMENTS

| EP | 0 781 806 A2 | 7/1997 |
| EP | 0 808 563 A | 11/1997 |
| EP | 0 934 695 A1 | 8/1999 |
| FR | 2 618 641 A | 2/1989 |
| JP | 1105448 | 7/1989 |
| JP | 07067489 | 3/1995 |
| JP | 09308403 | 2/1997 |
| WO | WO 88/00434 | 1/1988 |

* cited by examiner

*Primary Examiner*—Thomas Price
(74) *Attorney, Agent, or Firm*—Birch, Stewart, Kolasch and Birch, LLP

(57) ABSTRACT

An absorbent mat useful for treating pet excreta has a flat shape and comprises an absorbing base material comprising at least one of plant fiber and pulp, an antimicrobial surface active agent or a combination of a surface active agent and an antimicrobial agent, and at least one of a binder, a crosslinking agent and water, the absorbent mat having a thickness of 3 mm or greater, a bulk density of 0.05 to 0.3 g/cm$^3$, a saturated water absorption of 2 g/1 g or more, and a rate of water absorption of 30 sec or shorter.

24 Claims, 5 Drawing Sheets

Fig.5A
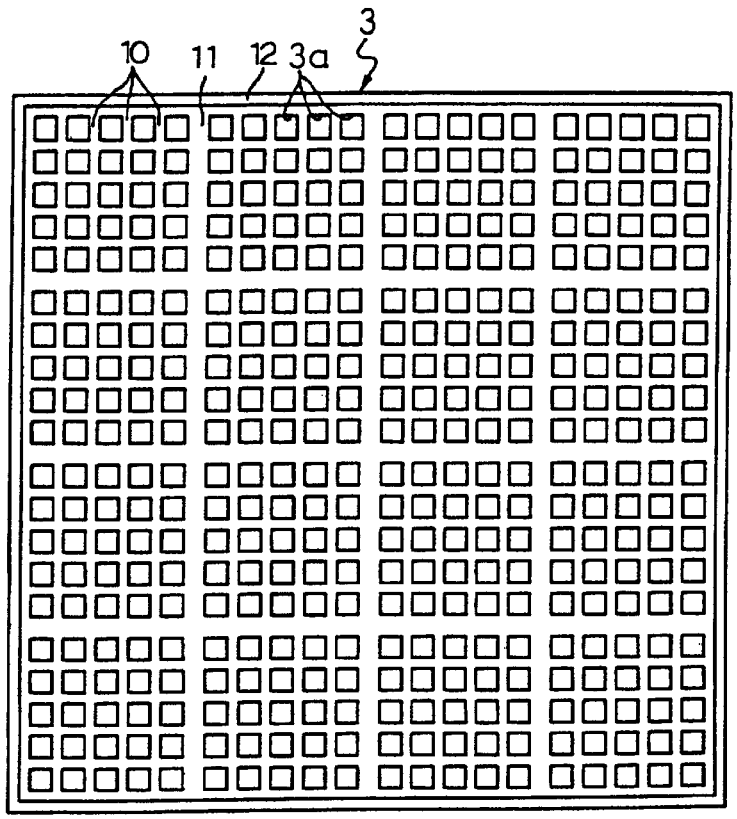
Fig.5B
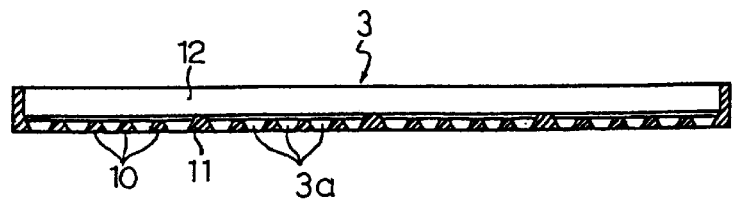
Fig.6A  Fig.6B  Fig.6C  Fig.6D
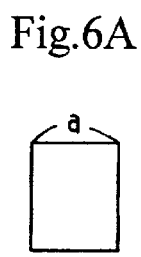 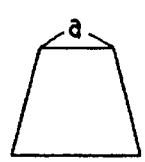 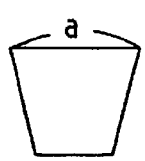 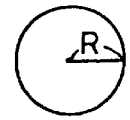

ABSORBENT MAT FOR EXCRETA TREATMENT

BACKGROUND OF THE INVENTION

The present invention relates to an absorbent mat for treating pet or human excreta and an excreta treating system using the same, particularly a system and a method for treating excreta of pets such as dogs and cats. The present invention also relates to a method of producing a pet excreta treating material, a pet toilet using the same, and a method of treating pet excreta using the same.

Molded granules for treating excreta discharged by pet animals such as cats and dogs and humans which comprise ground natural sand such as silica sand, and a particulate water-absorbing material such as zeolite or an absorbent polymer, are known. However, the granules have disadvantages that they tend to scatter to make surroundings dirty and generate dust during use by a pet or when handled by a pet owner; being amorphous and flowable, they are inconvenient to handle and dispose of; and they are not allowed to be disposed of as combustibles. Absorbent sheets for excreta treatment are also known. For example, Japanese Utility Model Laid-Open No. 1-105448 discloses a deodorizing and bactericidal urine sheet which is a paper-like sheet. The paper-like sheet, however, has poor absorbing capacity and poor strength so that it is inconvenient to handle and dispose of and cannot be used for a long time. Further, molded products for excreta treatment are also required to have a deodorizing effect. Molded products for excreta treatment which have a high deodorizing effect and are free from the above-described disadvantages have not been developed yet.

Japanese Patent Laid-Open No. 7-67489 proposes a bed for treating excreta of pet which has a porous member such as a metal net or a punched metal sheet partitioning the litter box into upper and lower parts, water-repellent litter placed on the porous member, and an absorbent member comprising a water-retentive absorbent polymer placed under the porous member. Urine having passed through the litter is absorbed and retained by the absorbent member.

However, the above bed gives no considerations to the urine which may stay on the porous member. Urine staying on the porous member emanates a pungent and offensive odor. Where the porous member is reinforced with ribs, etc., gaps are made between the porous member and the absorbent member. It tends to follow that liquid waste stays in film form over the entire openings of the porous member and causes an offensive odor. Further, this bed is designed to keep the litter in the upper part always dry by making the lower absorbent member absorb liquid waste. In other words, it chiefly aims at urine treatment. That is, when a pet gets rid of its solid waste, the whole litter must be exchanged for fresh one. In this respect there is no difference from a common litter, still leaving the problems of laboriousness and bad economy.

Japanese Patent Laid-Open No. 9-308403 discloses litter (pellets) prepared by heat compressing softwood sawdust which self-disintegrates on water absorption. If this litter is used in the above-described bed of Japanese Patent Laid-Open No. 7-67489, it will disintegrate upon absorbing urine, drop through the openings of the porous member, and scatter over the absorbent member. If this happens, it would be much time-consuming to exchange only the litter, and part of the disintegrated litter remains on the porous member to emanate an offensive odor. Besides, the litter must be exchanged each time the litter disintegrates on liquid absorption.

SUMMARY OF THE INVENTION

An object of the present invention is to provide an absorbent mat for treating excreta which is excellent in urine absorption properties and deodorizing effect, easy to handle and dispose of, and serviceable for an extended period of time.

Another object of the present invention is to provide an excreta treating system in which urine is prevented from staying on the upper part of the system and from emanating an offensive odor.

Still another object of the invention is to provide an excreta treating system which is handy to exchange and serviceable for a long time.

Yet another object of the invention is to provide an excreta treating system in which both urine and excrement can be treated easily and economically.

The above objects are accomplished by providing an absorbent mat for excreta treatment (hereinafter simply referred to an absorbent mat or, more simply, a mat) having a flat shape and comprising an absorbing base material comprising at least one of plant fiber and pulp, an antimicrobial surface active agent or a combination of a surface active agent and an antimicrobial agent, and at least one of a binder, a crosslinking agent and water, the absorbent mat having a thickness of 3 mm or greater, a bulk density of 0.05 to 0.3 $g/cm^3$, a saturated water absorption of 2 g/1 g or more, and a rate of water absorption of 30 sec or shorter.

The present invention also provides an excreta treating system comprising a draining board, the above-described absorbent mat laid under the draining board, and a tray in which the draining board and the mat for excreta treatment are put.

The present invention also provides an excreta treating system comprising a draining board and the absorbent mat laid underneath the draining board, the lower surface of the draining board and the upper surface of the mat are in close contact with each other.

The present invention also provides a method of treating excreta comprising the steps of laying the absorbent mat under a draining board and then allowing the mat to absorb pet liquid waste having been discharged on the draining board and passed through the draining board.

The present invention also provides an excreta treating system for pets comprising a draining board, the absorbent mat laid under the draining board, and an excreta treating material put on the draining board, the excreta treating material comprising molded pieces of prescribed shape and having sufficient shape retention not to disintegrate on water absorption.

The present invention also provides a method of producing an excreta treating material comprising molded pieces of prescribed shape and having sufficient shape retention not to disintegrate on water absorption, which method comprises molding a mixture of 70 to 97% by weight of a ground material of plant origin and 3 to 30% by weight of a synthetic resin into pieces of prescribed shape by use of a sprout molding machine.

The present invention also provides a pet toilet comprising a tray, the absorbent mat put in the tray, and liquid permeable nonwoven fabric covering the entire upper surface of the absorbent mat, the nonwoven fabric being fastened at prescribed positions so as to come into close contact with the upper surface of the absorbent mat.

The present invention also provides a method of treating pet excrement which uses the pet toilet, in which the nonwoven fabric is unfastened after a pet gets rid of its solid waste, rolling up the nonwoven fabric with the waste inside, and disposing of the nonwoven fabric together with the waste.

BRIEF DESCRIPTION OF THE DRAWINGS

The present invention will be more particularly described with reference to the accompanying drawings, in which:

FIGS. 5A and 5B are a plan view and a cross-sectional view, respectively, of the draining board used in FIG. 4;

FIG. 6A, FIG. 6B, FIG. 6C and FIG. 6D each present a typical cross-sectional contour of the parts surrounding through-holes of the draining board used in FIG. 4;

DETAILED DESCRIPTION OF THE PREFERRED EMBODIMENTS

Figure 1:
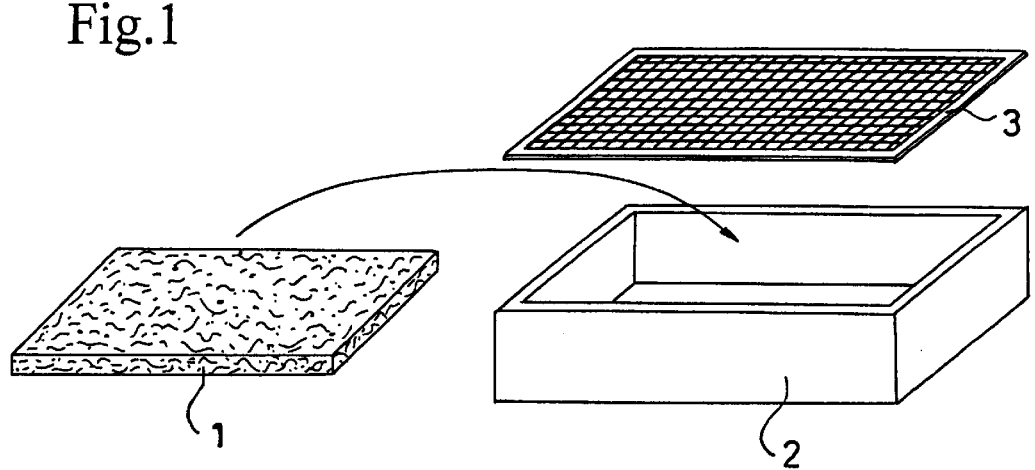
FIG. 1 is a perspective showing usage of the absorbent mat according to the present invention.

The present invention will be described with particular reference to its preferred embodiments and the accompanying drawings. As shown in FIG. 1, an absorbent mat 1 according to one embodiment of the invention is in a flat shape having some thickness with flat surfaces on its both upper and lower surfaces. The mat 1 is a molded article obtained by molding a mixture of (1) an absorbing base material, (2) an antimicrobial surface active agent or a combination of a surface active agent and an antimicrobial agent, and (3) at least one of a binder, a crosslinking agent, and water.

The absorbing base material comprises at least one of plant fiber and pulp. The mat molded from a mixture comprising plant fiber as a main component is not only porous and sparse (low density) to show excellent absorptivity for liquid but also effective in deodorization. Being combustible, it can be disposed of for incineration. The term "plant fiber" as used herein means fiber that constitutes plants or an aggregate thereof. Plant fiber comprises not only cellulose but lignin, hemicellulose, a resinous component, ash, and others. The term "pulp" as used herein means plant fiber substantially freed of the components other than cellulose to have a high cellulose purity. So called chemical pulp corresponds to the "pulp".

The plant fiber includes groundwood pulp, sawdust, jute, and palm fiber. These fibers can be used either individually or as a mixture thereof. From the standpoint of absorptivity, deodorizing effect, and stable supply, groundwood pulp and/or sawdust are particularly preferred. The term "groundwood pulp (GP)" as used herein is intended to include not only groundwood pulp in the narrow sense of the word but other kinds of mechanical pulp, such as stone ground pulp (SGP), refiner ground pulp (RGP) and thermomechanical pulp (TMP). Of these groundwood pulp kinds stone ground pulp is particularly preferred for its deodorizing action. The pulp may be either of softwood or hardwood. Pulp of German spruce is preferred. It is preferable to use pulp of wastepaper, which is preferably de-inked for securing absorptivity. The plant fiber and the pulp can be used as an absorbing base material either individually or as a mixture thereof. When used as a mixture, the plant fiber and the pulp are mixed at a weight ratio of 10:1 to 1:100.

It is preferred for the absorbent mat according to the invention to contain 50 to 95% by weight, particularly 70 to 90% by weigh, of the absorbing base material (the plant fiber and/or the pulp) for necessary strength as well as improved absorptivity and deodorizing effect.

The absorbent mat 1 contains an antimicrobial or non-antimicrobial surface active agent to have increased hydrophilic properties and an increased rate of absorption for urine, etc. The presence of the surface active agent as well as the low density and the porosity make the absorbent mat 1 exhibit a high water absorption and a high rate of water absorption as hereinafter described.

Where the surface active agent has antimicrobial action, growth of microorganisms, which decompose excreta to generate ammonia, in the absorbent mat 1 can be controlled so that the mat can be used for an extended period of time without emanating a pungent odor. Where the surface active agent has no antimicrobial effect, it is used in combination with an antimicrobial agent to produce the same effects.

The antimicrobial surface active agents which can be used include cationic ones and amphoteric ones. Useful cationic surface active agents having antimicrobial activity include an alkyltrimethylammonium chloride, a dialkyldimethylammonium chloride, and benzalkonium chloride, and mixtures of two or more thereof, with benzalkonium chloride being preferred for its antimicrobial effect. Useful amphoteric surface active agents having antimicrobial activity include an alkyldimethylaminoacetic acid betaine, an alkyldimethylamine oxide, an alkylcarboxymethylhydroxyethylimidazolinium betaine, an alkylamidopropyl betaine, and mixtures of two or more thereof, with an alkyldimethylamine oxide being preferred for its antimicrobial and deodorizing effects. If desired, the antimicrobial surface active agent can be used in combination with an antimicrobial agent to further ensure the antimicrobial activity of the mat 1. In this case, the antimicrobial agent to be combined is preferably water soluble.

To secure the improvement in absorptivity and the prevention of odor generation thereby to guarantee long serviceability, it is preferred for the absorbent mat 1 to contain 0.1 to 5% by weight, particularly 0.5 to 3% by weight, of the antimicrobial surface active agent.

The surface active agents having no antimicrobial activity include nonionic surface active agents, such as glycerol fatty acid esters, sorbitan fatty acid esters, polyoxyethylene sorbitan fatty acid esters, polyoxyethylene alkyl ethers, polyoxyethylene glycol fatty acid esters, and mixtures of two or more thereof. From the standpoint of water solubility, those having an HLB of 10 to 19 as calculated by a HLB-numerical system are preferred. The antimicrobial agents which can be used in combination with the non-antimicrobial surface active agent are preferably water-soluble and include sodium benzoate, chloramine T, chlorocresol, sodium salicylate, ethyltrimethylammonium bromide, potassium sorbate, sodium dehydroacetate, p-chlorophenol, phenol, and mixtures of two or more thereof Sodium benzoate is preferred from the viewpoint of odor and safety to animals.

It is preferred for the absorbent mat 1 to contain 0.01 to 5% by weight, particularly 0.1 to 5% by weight, especially 0.1 to 2% by weight, of the non-antimicrobial surface active agent together with 0.001 to 5% by weight, particularly 0.1 to 0.5% by weight, of the antimicrobial agent.

The binder, crosslinking agent or water is used as a means for binding the individual plant fibers and/or the individual pulp fibers (hereinafter these components will be inclusively referred to as an interfibrous binder). The interfibrous binder makes the absorbent mat 1 strong enough for practical use, easy to handle and dispose of, and durable for a long time.

The crosslinking agent serves to crosslink the fibers through a hydrogen bond and is suitably used in cases where the absorbent mat is produced by a wet process hereinafter described. The term "binder" as used herein is intended to mean an adhesive (a substance that can be used to make two solids, either of the same or different kinds, stick together) except the above-mentioned crosslinking agents.

The binders which can be used include polyvinyl alcohol, processed starch, agar, carboxymethyl cellulose, polyacrylamide, and mixtures of two or more thereof. Polyvinyl alcohol and/or processed starch are preferred for their water absorptivity. It is preferred for the polyvinyl alcohol and the processed starch to have a gelatinization temperature of 60° C. or higher, particularly 70 to 80° C., so as not to dissolve in the absorbent mat after use (i.e., in the wet state) at room temperature. Thus, the mat has a constant wet strength and is always easy to handle and dispose of, being prevented from shape disintegration. The binder is preferably used in an amount of 1 to 45% by weight, particularly 5 to 45% by weight, especially 7 to 20% by weight, based on the mat 1.

Substances commonly used in wet papermaking as a strengthening agent can be used as the crosslinking agent. Such crosslinking agents include polyamidoamine epichlorohydrin resins, polyacrylamide, polyethylene, methylolated polyacrylamide, and mixtures thereof. These crosslinking agents can be used as an interfibrous binder either alone or in combination with water as a medium. The crosslinking agent is preferably used in an amount of 0.01 to 3% by weight, particularly 0.3 to 1% by weight, based on the mat 1.

Where the absorbent mat 1 contains water as a sole interfibrous binder, a preferred water content of the absorbent mat 1 is 1 to 20% by weight, particularly 5 to 20% by weight.

If desired, the absorbent mat 1 can further contain additives, such as a deodorizing agent or a masking agent, in addition to the above-mentioned components (i.e., the absorbing base material, the antimicrobial or non-antimicrobial surface active agent, the antimicrobial agent, and the interfibrous binder). A suitable amount of the additives ranges from 0.01 to 1% by weight, particularly from 0.03 to 0.1% by weight.

The absorbent mat 1 is a flat plate having a thickness of 3 mm or greater, preferably 5 to 50 mm, still preferably 10 to 20 mm, molded out of a mixture comprising the above-described essential components and necessary additives. Compared with a paper-like sheet, the mat with a certain thickness has a higher water absorption capacity and higher strength. Unlike granular litter, the mat produces little dust when handled and is easy to dispose of.

The thickness of the absorbent mat is an average of thicknesses measured with a microgauge at 10 cm intervals in the width direction.

The absorbent mat 1 has a bulk density of 0.05 to 0.3 g/cm$^3$, preferably 0.1 to 0.25 g/cm$^3$, still preferably 0.15 to 0.2 g/cm$^3$. As far as the bulk density of the mat falls within this range, the mat exhibits an increased rate of absorption while retaining sufficient strength for use. Having such a low density and being porous, the absorbent mat is expected to release the water content of liquid waste once absorbed therein under a low humidity environment. Therefore, it is capable of absorbing liquid waste more than expected from the experimentally determined water absorption hereinafter described.

The bulk density (g/cm$^3$) of the mat is obtained by weighing a 6 cm wide, 6 cm long and 1 cm thick piece cut out of the mat and dividing the weight (g) by the volume of the cut piece (36 cm$^3$).

The absorbent mat 1 exhibits excellent absorption performance for liquid such as urine, having a saturated water absorption of 2 g/1 g or more, preferably 5 g/1 g or more, still preferably 8 g/1 g or more, and a rate of water absorption of 30 sec or shorter, preferably 10 sec or shorter, still preferably 3 sec or shorter. Such a high rate of water absorption effectively prevents the four limbs of a pet from getting wet with its own liquid waste. The upper limits of the saturated water absorption and the rate of water absorption are not limited and desirably as high as possible, but would be practically about 5 g/1 g and about 1 sec, respectively.

Figure 2:
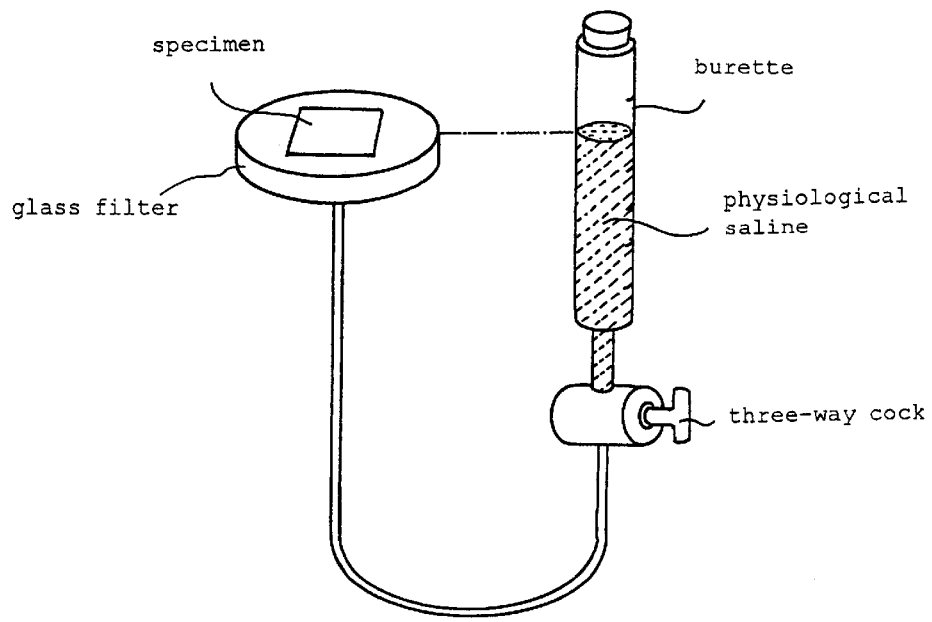
FIG. 2 schematically illustrates a method of measuring the saturated water absorption of an absorbent mat according to the invention.

The saturated water absorption is measured as follows by use of a demand wettability tester shown in FIG. 2, which is well known as an apparatus for carrying out a demand wettability (DM) test. A 60 mm wide and 60 mm long specimen is cut out of the mat without changing its thickness, dried in a drier set at 105° C. for 1 hour, and then allowed to cool to room temperature in a desiccator. The thus conditioned specimen is put on a glass filter set on the same level with the liquid level of physiological saline in the burette as shown in FIG. 2. The three-way cock is opened to let the specimen absorb physiological saline. When bubbling in the burette stops, the scale of the burette which indicates the reduction of physiological saline in amount is read and divided by the weight of the specimen to obtain the amount of water (g/g) absorbed to saturation. The measurement was made on three specimens per sample (n=3) to obtain an average.

The rate of water absorption is measured as follows. A 60 mm wide and 60 mm long specimen is cut out of the mat without changing its thickness, dried in a drier set at 105° C. for 1 hour and then allowed to cool to room temperature in a desiccator. In the center of the thus conditioned specimen is dropped 2.5 cc of physiological saline, and the time required for the liquid immediately after dropped to be absorbed by the specimen is obtained as a rate of water absorption (sec). The measurement was made on three specimens per sample (n=3) to obtain an average.

The absorbent mat 1 preferably has a wet strength of 49 cN or more, particularly 98 cN or more, especially 196 cN or more. With this wet strength the mat retains its plate shape after absorbing urine, etc. and can be handled and disposed of with ease. The higher the wet strength, the better. Taking the balance with other strength characteristics demanded into consideration, however, a practical upper limit would be around 196 cN.

Figure 3:
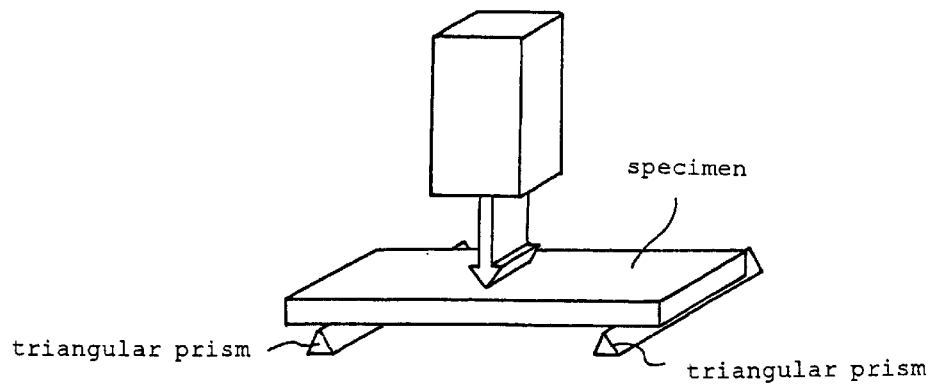
FIG. 3 schematically illustrates a method of measuring the wet strength of an absorbent mat according to the invention.

The wet strength is measured as follows. A specimen of 25 mm in width and 80 mm in length cut out of the mat without changing its thickness is soaked in water for 5 minutes. As shown in FIG. 3, the soaked specimen is placed on two triangular prisms 50 mm apart with the longitudinal middle of the specimen agreeing with the middle of the distance between the two prisms. A push-pull gauge is pressed down at that middle of the specimen, and the gauge pressure at break is measured to obtain a wet strength (cN). The measurement was made on three specimens per sample to obtain an average (n=3).

An absorbent mat satisfying the above-described various physical properties requirement (e.g., bulk density) is preferably produced by a method described later. Since groundwood pulp contains large quantities of highly rigid lignin and highly water-absorptive hemicellulose, an absorbent mat containing groundwood pulp in a prescribed proportion is bulkier and thicker with lower bulk density and thereby exhibits a higher saturated water absorption and a higher rate of water absorption than one containing general chemical pulp. Further, because groundwood pulp itself has deodorizing and antimicrobial effects to some extent, an absorbent mat prepared from a molding mixture comprising groundwood pulp as an absorbing base material, an antimicrobial substance (an antimicrobial agent or an antimicrobial surface active agent) and, if desired, a deodorizing agent can be used hygienically for an extended period of time without emanating an offensive odor. In general, an increased proportion of groundwood pulp tends to result in reduction of strength, particularly wet strength. The absorbent mat of the present invention, however, has sufficient strength, particularly wet strength, for practical use by virtue of the prescribed amount of the interfibrous binder. Although some interfibrous binders tend to reduce the hydrophilic properties of the absorbent mat to reduce the absorptivity for urine, etc., the presence of the prescribed amount of the surface active agent not only prevents such reduction of hydrophilic properties, which might be caused by some interfibrous binders, but endows the absorbent mat with higher absorptivity than expected of the groundwood pulp, thereby assuring extremely excellent absorbing performance for urine, etc.

The absorbent mat 1 for excreta treatment according to the present invention can be produced in either a dry process or a wet process. An example of the dry process comprises mixing the absorbing base material (e.g., plant fiber) with the surface active agent, the antimicrobial agent, and the interfibrous binder (e.g., a binder), molding the mixture in a mold of prescribed shape into a sheet, preliminarily dewatering the resulting sheet by hot pressing, and drying the sheet to a desired water content in a drier, etc. For securing the desired bulk density and thickness, the hot pressing is preferably carried out under a pressure of 4 to 2400 kPa, particularly 10 to 1000 kPa, at a temperature of 60 to 120° C., particularly 20 to 105° C., for a period of 0.5 to 20 minutes, particularly 3 to 5 minutes.

The wet process can be carried out, for example, in accordance with a wire papermaking method or a cylinder papermaking method generally adopted for papermaking by use of a known paper machine. In the wet process the crosslinking agent (paper strengthening agent) is used for preference as an interfibrous binder as previously stated. In particular, the absorbent mat 1 can be produced in the same manner as for insulation boards used as a core of tatami mats or a wallboard.

The absorbent mat 1 is suited for use as a member of an excreta treating system particularly for pet animals. The excreta treating system provided in the present invention comprises a draining board, the absorbent mat for excreta treatment which is laid under the draining board, and a tray in which the draining board and the absorbent mat are put.

In FIG. 1 is shown a pet toilet as an embodiment of the excreta treating system. The pet toilet is made by laying an absorbent mat 1 in a tray 2 and placing a net-like draining board 3 thereon to physically protect the absorbent mat 1. In assembling the pet toilet, the absorbent mat 1, being a solid plate with thickness, can be handled easily without dusting as with the case of granular litter. Since the absorbent mat 1 controls a bad odor after use by a pet owing to its high deodorizing and antimicrobial effects, the pet toilet is so hygienic that no consideration as to where to place is needed. The pet toilet can be used for a long time in virtue of the excellent absorption performance and capacity of the absorbent mat 1 as well as the high deodorizing and antimicrobial effects. Even after absorbing a large amount of liquid waste in long-term use, the absorbent mat 1 retains its plate shape because of its high wet strength so that it can be taken out easily and disposed of as combustibles.

The absorbent mat 1 according to the present invention is applicable to not only treatment of pets' excreta but human's. The usage of the absorbent mat 1 is not particularly limited.

Figure 4:
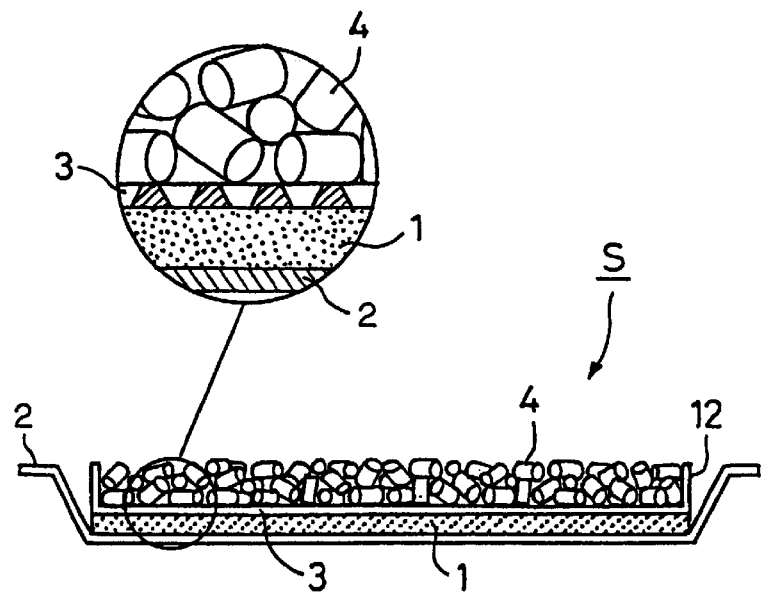
FIG. 4 is a schematic illustration showing an embodiment of the excreta treating system according to the present invention.

Another embodiment of the excreta treating system of the present invention is shown in FIG. 4, in which the system S has a draining board 3 and the absorbent mat 1 of flat shape which is laid beneath the draining board 3, and the draining board 3 and the mat 1 are contained in a tray 2. The lower side of the draining board 3 and the upper side of the mat 1 are in intimate contact. As shown in FIG. 4, the system S preferably has litter 4 on the draining board 3.

As shown in FIGS. 5A and 5B, the draining board 3 has a rectangular shape in its plan view and has a large number of through-holes 3a. Parts 10 surrounding the through-holes 3a (i.e., the parts between adjacent through-holes 3a) have a prescribed shape in their vertical cross section, such as a rectangle, a trapezoid or a circle as depicted in FIGS. 6A through 6D. The bases of all the parts 10 (11) are on the same plane to form an even surface on the lower side of the draining board 3. There is no reinforcing members such as ribs on the lower side of the draining board 3 so that the even lower surface of the draining board 3 and the upper surface of the absorbent mat 1 are in close contact with no gaps therebetween.

In order to smoothly lead liquid waste discharged on the draining board 3 to the underlying absorbent mat 1 through the through-holes 3a, the width "a" (see FIGS. 6A to 6C) of the part 10 which is a rectangle or a trapezoid in its cross section or the radius R (see FIG. 6D) of the part 10 which is a circle in its cross section is preferably 2 mm or less, still preferably 1 mm or less.

The horizontal cross-sectional contour and the arrangement of the through-holes 3a are not particularly limited except for the above-described preferred configuration of the parts surrounding the through-holes 3a. From the viewpoint of ease of molding and strength and in relation to the shape of the litter that is put on the draining board 3, preferred horizontal cross-sectional contours of the through-holes include regular polygons such as a regular triangle, a square, a regular pentagon and a regular hexagon, a circle, and a combination thereof. It is preferred that the through-holes are in a closest arrangement. For example, through-holes having a hexagonal lateral cross section are preferably arranged to form a honeycomb structure.

If necessary, some of the parts 10 surrounding the through-holes can be made higher or wider than the other parts 10 as indicated by numeral 11 in FIGS. 5A and 5B to increase the strength of the draining board 3a. In this case, too, the lower side of all the parts 10 inclusive of the parts 11 should be even.

Where the draining board 3 is covered with litter 4 as illustrated in FIG. 4, it is preferred for the draining board 3 to have walls 12 on every side so as to prevent the litter 4 from spilling and to allow the litter 4 to be washed as it is on the draining board 3. The walls 12 are preferably 50 to 300 mm high, still preferably 100 to 200 mm high.

The contour of the draining board 3 includes, but is not limited to, a rectangle, a circle, and an ellipse. The area of the draining board 3 is preferably, but is not limited to, 400 to 3600 cm$^2$, still preferably 900 to 2500 cm$^2$.

The draining board 3 can be made of any material that is resistant against corrosion by excreta. From the viewpoint of lightness, ease of handling, and moldability, integrally molded one made of general-purpose synthetic resins, such as polypropylene, polyethylene, polyethylene terephthalate, polyvinyl chloride, and ABS, is preferred.

The draining board 3 can be produced by injection molding the above-described synthetic resin. The injection mold is preferably designed to leave a pin gate mark of the molten resin on the lower side of the draining board 3 so that liquid waste may be prevented from staying in the recess of the gate mark to ensure prevention of offensive odor generation.

The draining board 3 is preferably given water repellent finish for modifying the surface wettability and helping liquid waste pass through the through-holes 3a or antimicrobial finish. Water repellent finish or antimicrobial finish can be carried out in a usual manner.

Liquid waste having passed through the litter 4 immediately passes through the through-holes 3a of the draining board 3 without staying on the draining board 3 or forming film of liquid over the through-holes 3a. Therefore, generation of an offensive odor can be prevented certainly.

In the excreta treating system of the present invention, while it is particularly preferred that the lower side of the draining board 3 and the upper side of the absorbent mat 1 be in intimate contact over the whole area thereof, it is preferred that the contact area be at least 80%, particularly 90% or more. If the contact area is smaller than 80%, it is likely that urine staying on the draining board emanates a bad odor. While it is particularly preferred for the absorbent mat 1 to have a flat upper surface, it may have depressions mating the projections, if any, on the lower surface of a draining board, such as strengthening ribs, so that the draining board and the mat 1 may be brought into intimate contact.

The draining board which can be used in the excreta treating system of the invention is not limited to the above-described type (draining board 3), which is a preferred draining board, and other types of draining boards can be used as long as the lower surface thereof can be brought into close contact with the upper surface of the mat 1.

In the excreta treating system shown in FIG. 4, the liquid waste discharged by a pet passes through the litter 4 to reach the draining board 3, then passes through the through-holes 3a without staying on the draining board 3, and is swiftly absorbed by the absorbent mat 1.

The tray 2 which can be used in the excreta treating system of FIG. 4 has a size and strength enough for containing the mat 1, the draining board 3, and the litter 4 and exhibits anticorrosion. While the material and the shape of the tray 2 are not particularly restricted, it is preferably made of synthetic resins, such as polypropylene, polyethylene, polyethylene terephthalate, polyvinyl chloride, and ABS, for ease of handling and moldability.

The litter 4 which can be used in the excreta treating system of FIG. 4 preferably has a spherical or cylindrical shape for letting liquid waste pass through without allowing it to stay. The litter 4 must not fall through or clog the through-holes 3a of the draining board 3 and not hinder the passage of liquid. From this viewpoint the litter 4 preferably has a diameter of 2 to 8 mm, particularly 4 to 6 mm. The litter 4 can be of any material that can take the above-described shape and is resistant to corrosion by excreta. From the standpoint of deodorizing, woodmeal, bean curd waste, cake of soybean oil, coconut oil or rapeseed oil, and the like are preferred materials of the litter 4.

In a particularly preferred embodiment of the excreta treating system shown in FIG. 4, the litter 4 is a pet excreta treating material comprising molded pieces of prescribed shape which have sufficient shape retention not to disintegrate on water absorption. Such a pet excreta treating material typically includes, but is not limited to, molded cylinders whose height is slightly greater than the diameter, e.g., having a diameter of about 5 to 7 mm and a height of about 3 to 15 mm. The shape of the excreta treating material can be selected according to the use. The excreta treating material preferably comprises a ground material of plant origin and a synthetic resin.

The excreta treating material is porous. It also has water absorbing properties which are ascribed to its being porous and having a material of plant origin. Note that it is not essential for the excreta treating material to have high water absorptivity. It is rather preferred for the treating material to have moderately low water absorption. More specifically, the water absorption, measured by the method described later, of the excreta treating material is preferably 3 to 10%, particularly 5 to 8%. This water absorption is advantageous in that the discharged liquid waste swiftly passes through the gaps among the pieces of the excreta treating material and is absorbed by the absorbent mat 1 which is laid under the draining board 3 and that the liquid waste is prevented from staying on the surface of the excreta treating material as drops and giving off an offensive odor. The material of plant origin, which constitutes the excreta treating material, contains substances having a deodorizing effect, such as phenolic substances, which is also advantageous for preventing odor generation.

Since the excreta treating material has sufficient shape retention not to disintegrate on water absorption, it retains its original shape after urine absorption and is therefore easy to exchange. Further, it does not need to be exchanged every time a pet gets rid of its waste liquid, which is an economical advantage. Having a moderately low water absorption as mentioned above, the excreta treating material hardly allows urine to remain thereon, thereby preventing bad odor emanation.

The excreta treating material preferably has a dusting ratio, which represents the degree of shape retention, of 10% by weight or less, particularly 2% by weight or less, measured by the method hereinafter described. With the dusting ratio being controlled below this range, the excreta treating material maintains its solid state sufficiently even after urine absorption and can easily be exchanged for a fresh one. The lower the dusting ratio, the better. A practical lower limit would be about 0.1%, however, in the light of the constituent materials and the method of production.

Method of Measuring Dusting Ratio and Water Absorption

The excreta treating material weighing 70 g is put in a cylinder of 80 mm in diameter and 100 mm in height which has a net of 2.8 mm opening as a base. The cylinder and contents are weighed. The cylinder and contents are soaked in water at 25±3° C. for 5 seconds and, after pulled out of water, placed on an absorbent sheet Kim Towel (trade name, available from CRECIA; basis weight: 30 g/m$^2$) for 20 seconds. Then the contents are transferred into another cylinder of the same kind. The transfer between the two cylinders is repeatedly conducted 50 times. The dust produced by the repetition of transfer is collected, dried at 105° C. for 30 minutes, and weighed. The measured weight (g) is divided by 70 g, and the quotient is multiplied by 100 to give the dusting ratio (%) of the excreta treating material.

Separately, the soaking wet cylinder and contents are placed on the same absorbent sheet as used above for 20 seconds and then weighed. The difference between the thus measured weight and the weight of the cylinder and contents before soaking is the amount of water absorbed (g), which is divided by 70 g, and the quotient is multiplied by 100 to give a water absorption (%) of the excreta treating material.

The material of plant origin, which is one of the constituent materials of the excreta treating material, can be either of trees or grasses. The ground materials of plant origin include ground trees (wood or bark), seed oil cake, ground grain husks, and ground grasses. Ground trees, especially of conifers, such as ceders, pines, and cypresses, are preferred for moldability and deodorizing effects. The ground material preferably has a particle size of about 0.01 to 1 mm, particularly about 0.05 to 0.5 mm.

The excreta treating material comprises 70 to 97% by weight, preferably 85 to 95% by weight, of the ground material of plant origin. With the plant grinds content being less than 70% by weight, the excreta treating material would be insufficient in not only water absorptivity but deodorizing effect. If the plant grinds content exceeds 97% by weight, a considerable amount of dust would be produced after water absorption.

The synthetic resin, which is another constituent material of the excreta treating material, serves to secure shape retention and controlled water absorption. Useful synthetic resins include polyolefins such as polyethylene and polypropylene, polyesters such as polyethylene terephthalate, polyamides, and vinyl polymers. Synthetic resins having a melt flow rate (hereinafter "MFR") of 3 to 200 g/10 min, particularly 10 to 100 g/10 min, are preferred for obtaining shape retention and for preventing dusting after water absorption. The MFR is measured in accordance with JIS K7210-1999 (ISO 1133-1997). It is also preferred to use hydrophobic resins.

The excreta treating material comprises 3 to 30% by weight, preferably 5 to 15% by weight, still preferably 7 to 12% by weight, of the synthetic resin. If the resin content is less than 3% by weight, the excreta treating material will produce a considerable amount of dust. A resin content exceeding 30% by weight not only reduces the water absorptivity but is uneconomical, while dusting could be reduced.

If desired, the excreta treating material can contain additives such as an antimicrobial agent and a colorant. The amount of the additives is preferably 0.01 to 0.5% by weight based on the excreta treating material.

The excreta treating material is preferably produced by mixing the ground material of plant origin and the synthetic resin powder at a predetermined ratio and molding the mixture by use of a sprout molding machine. To achieve uniform mixing, the synthetic resin powder preferably has a particle size of about 0.01 to 0.5 mm, particularly about 0.1 to 0.3 mm.

By using a sprout molding machine, the mixture is densified to provide molded pieces that have sufficient shape retention not to disintegrate on water absorption. Besides, the molded pieces obtained are porous and have moderately low water absorptivity.

Molding by use of a sprout molding machine is preferably conducted with no heat applied externally because the mixture spontaneously generates heat in the molding machine, by which the synthetic resin melts sufficiently to act as a binder for the grinds of plant origin.

When the excreta treating material having the above-described characteristics is used as litter 4 in the excreta treating system S shown in FIG. 4, urine discharged by a pet, e.g., a cat passes through the gaps of the molded pieces and quickly absorbed by the absorbent mat 1 which is laid under the draining board 3. Therefore, only if the mat 1 is exchanged, the time interval for exchanges of the excreta treating material is extended. The excreta treating material retains its shape after absorption without disintegration and is easy to handle. Further, since the excreta treating material is not so water absorptive, urine hardly remains on its surface and is thereby prevented from giving off an offensive odor.

According to the excreta treating system of the present invention, liquid waste from a pet can be absorbed quickly without remaining on the surface of litter so that emanation of an offensive odor can certainly be prevented for an extended period of time.

The above-mentioned excreta treating material is suited for use in the excreta treating system shown in FIG. 4 but is also useful as cat litter as has been used in a container, e.g., a litter box. The excreta treating material can also be used for other small animals, such as a small dog.

The method for treating excreta according to the present invention will be described with reference to its preferred embodiment in which the excreta treating system S is used.

The absorbent mat 1 is put under the draining board 3 as shown in FIG. 4. The mat 1 and the draining board 3 are preferably put in the tray 2. It is preferable to put an adequate amount of litter 4 on the draining board 3. When a pet, e.g., a cat or a dog gets rid of its liquid waste, the liquid waste passes through the through-holes 3a of the draining board 3 and is absorbed by the mat 1.

Where litter 4 is put on the draining board 3, the amount of the litter 4 is preferably 1 to 3 g/cm$^3$, still preferably 1.5 to 2.5 g/cm$^3$, for efficiently leading liquid waste to the mat 1.

The absorbent mat 1 used in the system of FIG. 4 may be replaced with other absorbent members, such as an absorbent plate molded from a clay mineral or an absorbent sheet comprising a mixture of pulp and an absorbent polymer wrapped in nonwoven fabric, etc.

The absorbent plate is prepared by mixing a clay mineral, e.g., kaolin, bentonite, zeolite or diatomaceous earth, ground to powder of prescribed size, water, and a binder into a slurry, casting the slurry into a mold of prescribed shape, drying the cast mixture to a prescribed water content at a prescribed temperature, followed by removal from the mold. The binder includes corn starch, potato starch, tapioca starch, methyl cellulose, and carboxymethyl cellulose. From the standpoint of water absorptivity, deodorizing effect, and cost, the clay mineral is preferably used in a proportion of 80 to 95% by weight, particularly 88 to 92% by weight, based on the slurry. From the standpoint of shape retention, the binder is preferably used in a proportion of 5 to 15% by weight, particularly 8 to 12% by weight, based on the slurry.

The absorbent sheet is prepared by mixing pulp and an absorbent polymer in a usual manner to prepare an absorbing composition and wrapping the composition in a sheet of nonwoven fabric, etc. to make a sheet form. The pulp includes chemical pulp and mechanical pulp. The mixing ratio of the pulp is preferably 70 to 90% by weight, still preferably 80 to 85% by weight. The absorbent polymer includes a starch-acrylic acid copolymer, a crosslinked polyacrylic acid salt, a vinyl ester-unsaturated carboxylic acid copolymer, an isobutylene-maleic anhydride copolymer, a crosslinked starch-acrylonitrile copolymer or a hydrolyzate thereof, a crosslinked carboxymethyl derivative, a crosslinked polyethylene oxide derivative, a partial hydrolyzate of polyacrylamide, and crosslinked polyvinyl alcohol. The mixing ratio of the absorbent polymer is preferably 10 to 30% by weight, still preferably 15 to 20% by weight. The absorbent polymer can be powder, granules, flakes, lumps, beads, fibers, etc. From the standpoint of ease in handling and distributing by suction, a powder form is preferred. The wrapping material includes nonwoven fabric, such as heat-rolled nonwoven fabric and air-through nonwoven fabric, with heat-rolled nonwoven fabric being preferred for the economical consideration.

Figure 7:
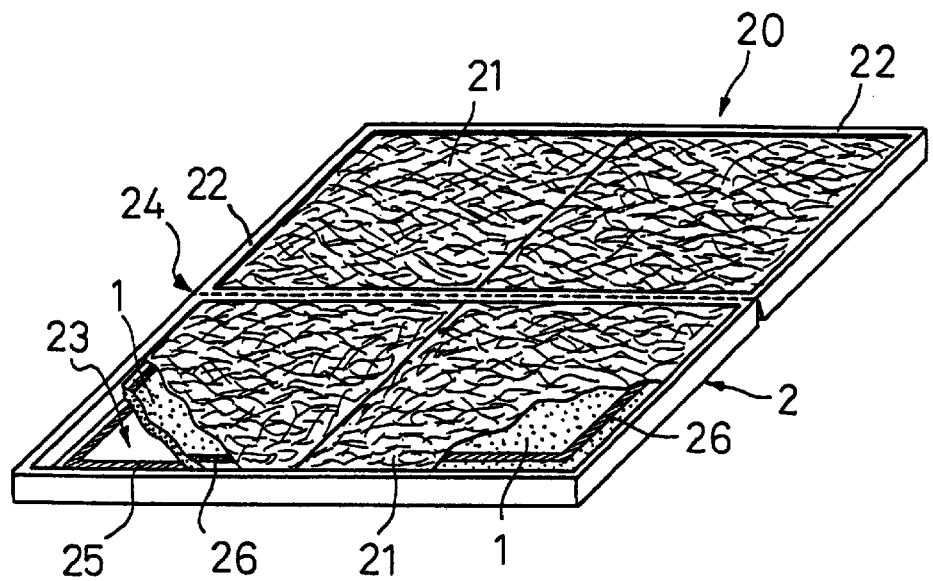
FIG. 7 is a perspective of an embodiment of the pet toilet according to the invention, with part of which is cut away.
Figure 8:
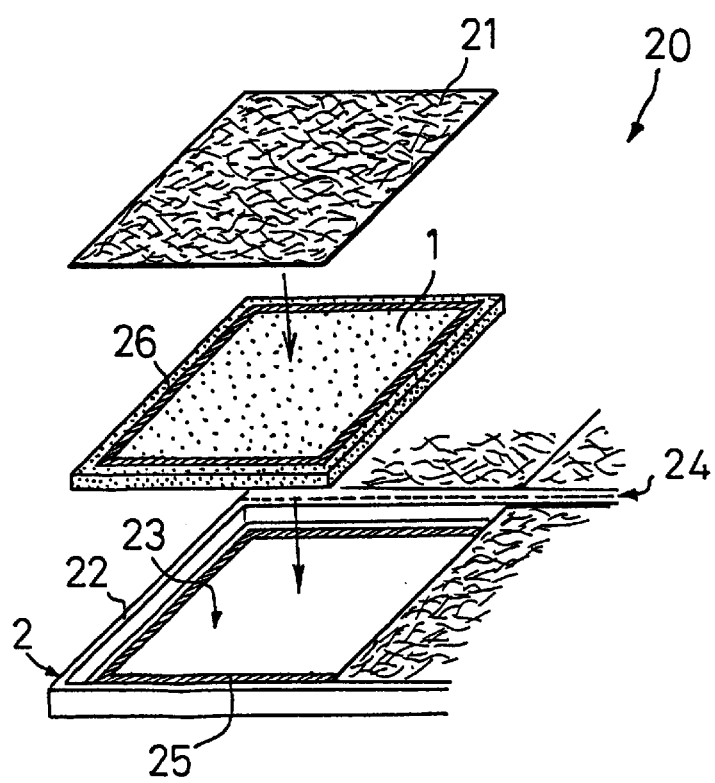
FIG. 8 is an exploded perspective view of part of the pet toilet shown in FIG. 7.

FIG. 7 presents a perspective of a pet toilet with a part cut away, which is another example of the excreta treating system of the present invention. FIG. 8 is an exploded view of part of the pet toilet shown in FIG. 7.

The pet toilet 20 shown in FIGS. 7 and 8 is especially suitable for larger animals, such as a large dog. It has a tray 2, an absorbent mat 1 for excreta treatment, and liquid-permeable nonwoven fabric 21.

The tray 2 is rectangular in its plan view and has its four edges 22 raised to form a shallow depression 23, which is also rectangular in its plan view and in which the absorbent mat 1 is put. The height of the edged 22 from the bottom of the depression 23 is somewhat larger than the thickness of the mat 1.

The tray 2 has a bend 24 in the center, by which the tray 2 is partitioned into halves and is capable of bending. The two halves are joined by a hinge so that they can swing. The hinge has a locking mechanism to fix the bent state. A known hinge with a locking mechanism can be used.

The depression 23 has, on its peripheral portion, a fastening member for fixing the absorbent mat 1, which can be a Velcro closure (either a loop member or a hook member) in the embodiment shown.

Four rectangular absorbent mats 1 are disposed in the depression 23. So the depression 23 is divided into four equal portions. Each mat 1 preferably has a flat surface on at least the side facing the nonwoven fabric 21 so that the mats 1 and the nonwoven fabric 21 may be brought into close contact, making no space for liquid waste to stay. As a result, production of an offensive odor can be minimized.

The absorbent mat 1 has a fastening member on its side facing the bottom of the depression 23 at the positions mating the fastening member provided on the depression 23, which can be a Velcro closure (either a loop member or a hook member), whereby the mats 1 and the tray 2 can be fastened together firmly.

The absorbent mat 1 used in this embodiment preferably has a thickness of 3 mm or more, particularly 5 to 50 mm, especially 10 to 20 mm. With this thickness, it has a larger capacity for urine absorption and higher strength than a conventional absorbent sheet. Unlike particulate or granular litter, the mat 1 produces little dust on handling and is easy to dispose of.

The absorbent mat 1 has a fastening member 26 on the peripheral portion thereof for fixing the nonwoven fabric 21 thereto. In this embodiment, a hook member of a Velcro closure is used as a fastening member 26.

The nonwoven fabric 21, which covers the entire upper surface of the mat 1 should be permeable to liquid. The nonwoven fabric 21 can be subjected to a treatment for hydrophilic finish to have improved liquid permeability. It is preferred that the nonwoven fabric 21 be strong enough for use by an animal such as a dog. Nonwoven fabrics that meet these requirements include heat-rolled nonwoven fabric, spunbonded nonwoven fabric, and air-through nonwoven fabric. To secure sufficient liquid permeability and sufficient mechanical strength balanced with cost, the nonwoven fabric 21 preferably has a basis weight of 10 to 100 $g/m^2$, particularly 15 to 35 $g/m^2$.

The nonwoven fabric 21 is firmly fixed to the mat 1 by the fastening member 26 (e.g., a hook member of Velcro) with close contact. There is no need to provide the nonwoven fabric 21 with a loop member because the hooks of the fastening member 26 bite the fibers constituting the nonwoven fabric 21.

The pet toilet 20 shown in FIGS. 7 and 8 is used as follows. When a pet animal, e.g., a dog discharges its liquid waste on the toilet 20, the liquid passes through the nonwoven fabric 21 and is quickly absorbed by the mat 1. Since the nonwoven fabric 21 and the absorbent mat 1 are in close contact, little liquid stays therebetween so that generation of an offensive odor from urine is prevented effectively. Odor generation is further suppressed by incorporating a deodorant or an antimicrobial agent into the mat 1. The pet toilet 20 can be used very hygienically with no need to consider where to place. The absorbent mat 1 exhibits high water absorptivity to absorb a large quantity of urine. The control on emanation of an offensive odor and the high absorbing capacity allow the mat 1 to be used for a prolonged period of time without an exchange. As previously described, the absorbent mat 1, having high wet strength to retain its shape after urine absorption, is easily removed from the tray 2 after use and disposed of as combustibles or incinerated.

When, on the other hand, a pet animal gets rid of its solid waste on the toilet 20, the nonwoven fabric 21 is unfastened from the fastening member (hook member) 26 of the mat 1 and removed from the mat 1 while wrapping therein the solid waste. In this way, the solid waste can be disposed of without soiling user's hand. Whether or not the mat 1 is to be exchanged here depends on the amount of liquid waste that has been absorbed by that time.

As described above, the pet toilet 20 is convenient to treat pet excreta (i.e., both liquid and solid waste).

Figure 9:
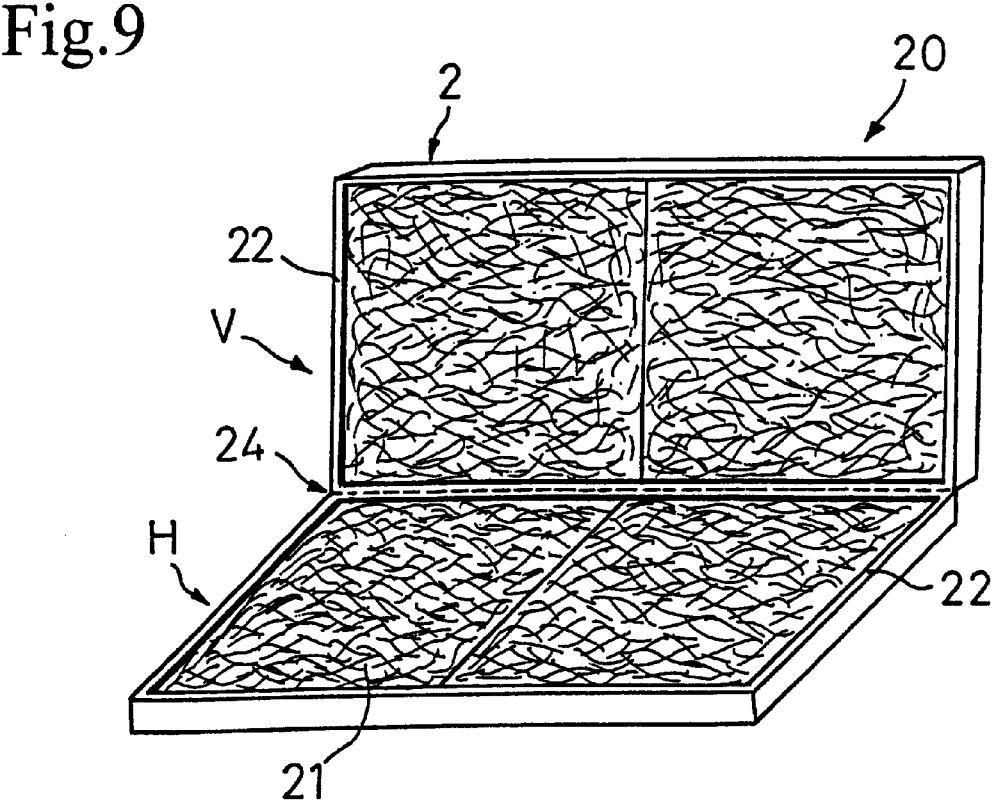
FIG. 9 shows another usage of the pet toilet shown in FIG. 7.

It is possible to use the toilet 20 in the manner illustrated in FIG. 9, which is especially suitable for male dogs. In this case, the tray 2 is bent at the bend 24 to make a toilet having a horizontal portion H and a vertical portion V forming a prescribed angle therebetween. The angle between the two portions H and V is usually around 90° while arbitrarily adjustable. The selected angle can be fixed by the aforementioned locking mechanism. Both the horizontal portion H and the vertical portion V are capable of absorbing urine so that the four limbs of a pet are prevented from being soiled by its own liquid waste.

While in the above-described embodiment the fastening member for fixing the nonwoven fabric 21 is provided on the upper side of the absorbent mat 1, fastening members for fixing the nonwoven fabric 21, for example, hook members of Velcro may be provided on the edges 22 of the tray 2. In this case, however, the top of the edges 22 is made lower than the upper surface of the mat 1 so as to bring the nonwoven fabric 21 into close contact with the mat 1.

A clamping frame can be used for fixing the nonwoven fabric 21 in place of the fastening member provided on the mat 1 or on the edges 22. The inner dimensions of the clamping frame agree with the outer dimensions of the tray (edges 22) so that the frame is fitted around the tray 2 with the nonwoven fabric 21 clamped therebetween. Thus the nonwoven fabric 21 can be fixed on the mat 1.

For small pet animals, the tray 2 can be made smaller than in the above-described embodiment. In that case, one or two mats 1 will do.

The position of the bend 24 is not limited to the center of the tray 2 as in the above-mentioned embodiment.

The particulars that have been described with the above embodiments are appropriately interchangeable with each other.

The present invention will now be illustrated in greater detail with reference to Examples. The following Examples are presented as being exemplary of the present invention and should not be construed as limiting. Unless otherwise noted, all the percentages, parts, and ratios are by weight.

EXAMPLES 1 TO 3

Absorbent mats for excreta treatment were prepared by the method described below. The bulk density, saturated water absorption, rate of water absorption, wet strength, and thickness of the resulting mats were measured in accordance with the methods previously described. The results obtained are shown in Table 1 below together with the composition and the preparation conditions.

Method of Preparation (1) Stone ground pulp (SPG) was mixed with (2) a 2% aqueous solution of lauryldimethylamine oxide (Anhitol 20N, available from Kao Corp.) as an antimicrobial surface active agent, or a combination of (2a) polyoxyethylene sorbitan fatty acid ester (Leodor TW-L120, available from Kao Corp.) as a surface active agent and (2b) sodium benzoate (Ansokukosan Natorium, available from Jomi Seiyaku K. K.) as an antimicrobial agent in a Henschel mixer. The mixture was further mixed with (3) tapioca starch (Z-100, available from Nichiden Kagaku K. K.) as an interfibrous binder. The resulting mixture was cast in a mold of prescribed shape and dehydrated. The molded product was pressed in a hydraulic press under the conditions shown in Table 1 and further dried in a drier at 105° C. for 3 hours to obtain an absorbent mat for excreta treatment.

Comparative Example 1

A commercially available pet toilet sheet (DEOSHEET, supplied by UNI-HEARTOUS) was examined for a saturated water absorption and a rate of water absorption according to the methods described above. The results obtained are shown in Table 1.

The absorbent mats obtained in Examples 1 to 3 and Comparative Example 1 were evaluated for absorptivity, deodorizing effect, and sustainability of the deodorizing effect according to the following methods and criteria.

1) Evaluation of Absorptivity

The rate of water absorption as measured was graded in the following scale.

A' . . . The rate of water absorption is 3 sec or shorter.

A . . . The rate of water absorption is longer than 3 sec and not longer than 10 sec.

B . . . The rate of water absorption is longer than 10 sec and not longer than 30 sec.

C . . . The rate of water absorption is longer than 30 sec.

2) Evaluation of Deodorizing Effect

A frozen sample of urine collected from an 8-year-old male beagle was thawed. A 5 ml of the urine was splattered on the absorbent mat (50 mm×50 mm×15 mm (t)) with a measuring pipette, and the mat was left to stand at 25° C. and 65% RH for 30 minutes.

A panel of three members were asked to smell the absorbent mat immediately after the 30-minute standing and to score the odor on a 5-scale (1: odorless; 2: very slight; 3: slight; 4: slightly strong; 5: strong). The scores were added up and averaged. A score of 1 was graded A; a score of 2 to 3, B; and a score of 4 to 5, C.

3) Evaluation of Sustainability of the Deodorizing Effect

A panel of three members were asked to smell the urine-soiled absorbent mat immediately after the 30-minute

TABLE 1

|  | Composition (% by weight) | | | | | Pressing Conditions | | | Physical Properties of Absorbent Mat | | | | |
| --- | --- | --- | --- | --- | --- | --- | --- | --- | --- | --- | --- | --- | --- |
|  | | | | | | Temp. | Time | Pressure | Bulk Density | Saturated Water | Rate of Water | Wet Strength | Thickness |
|  | (1) | (2) | (2a) | (2b) | (3) | (° C.) | (min) | (Pa) | (g/cm³) | Absorption (g/g) | Absorption (sec) | (cN) | (mm) |
| Example 1 | 88 | 2 | — | — | 10 | 120 | 15 | 2 × 10⁵ | 0.23 | 3.56 | 4.3 | 45 | 9 |
| Example 2 | 89.4 | 1.6 | — | — | 10 | 90 | 10 | 2 × 10⁵ | 0.175 | 4.87 | 1.3 | 185 | 15 |
| Example 3 | 88.6 | — | 2 | 0.4 | 10 | 100 | 10 | 2 × 10⁵ | 0.190 | 3.95 | 2.0 | 203 | 15 |
| Comparative Example 1 | — | — | — | — | — | — | — | — | — | 50.00 | 1.8 | — | — |

(1) SGP
(2) Antimicrobial surface active agent
(2a) Surface active agent;
(2b) Antimicrobial agent
(3) Interfibrous binder standing (25° C., 65% RH) in the same manner as in the evaluation (2). Then, the mat was further allowed to stand at 25° C. and 65% RH, and the panelists were asked to smell the mat for every 24 hour-standing. The time (from the end of the first 30-minute standing) when a panelist felt that the odor was stronger than that immediately after the 30-minute standing was recorded and rated according to the following A-to-C scale.

A . . . No change in strength of the odor is perceived even after three days elapsed.

B . . . Change in strength of the odor is not perceived after one day elapses, but the odor has gotten stronger before three days elapse.

C . . . The odor has gotten stronger before one day elapses.

Specifications of Absorbent Mat

Shape and external dimensions: 300×300 mm rectangle; thickness: 10 mm wood fiber molded product: ground-wood pulp/corn starch/water=100/10/70

Surface active agent: 0.2% of Anhitol 20N (amphoteric surface active agent available from Kao Corp.) based on the wood fiber molded product Evaluation of State of Liquid on Draining Board A . . . Hardly remains B . . . Slightly small amount remains C . . . Difficult to decide D . . . Slightly large amount remains E . . . Large amount remains

TABLE 3

| | External Dimensions of Draining Board (mm) | Contour of Parts Surrounding Through-holes | Height of Parts Surrounding Through-holes (mm) | Height or Ribs (mm) | State of Liquid on Draining Board |
|---|---|---|---|---|---|
| Example 4 | 300 × 300 × 10 (t) | trapezoid (upper side: 2 mm; lower side: 3 mm) | 2 | 0 | B |

TABLE 2

| | Absorptivity | Deodorizing Effect | Sustainability of Deodorizing Effect |
|---|---|---|---|
| Example 1 | A | A | A |
| Example 2 | A' | A | A |
| Example 3 | A' | A | A |
| Comparative Example 1 | A' | C | C |

EXAMPLE 4

An excreta treating system was made by putting a draining board whose specifications are described below on an absorbent mat prepared in a wet process and having the following specifications. Artificial urine having the following composition in a washing bottle was splattered on the system at a rate of 30 ml/10 seconds. The state of the liquid on the draining board was observed with the naked eye and rated as follows.

Specifications of Draining Board

Shape and external dimensions: 300×400 mm rectangle with a 160 mm high edge on every side.

Crosssectional contour of parts surrounding through-holes (along the longitudinal direction of draining board): trapezoid (upper side: 1.5 mm; lower side: 2.5 mm)

Opening area on the upper surface: 4 mm×4 mm

Opening area on the lower surface: 3 mm×3 mm

Material: polypropylene

In the excreta treating system of Example 4, the draining board, having a flat plane with no ribs on its lower side, secures a close contact with the mat lying under. It was confirmed that little liquid (artificial urine) remained on the upper surface of the draining board and was smoothly absorbed by the mat without forming film over the through-holes so that the system gave off no bad odor.

EXAMPLES 5 TO 7

An excreta treating system was made in the same manner as in Example 4, except that the crosssectional contour of the parts surrounding the through-holes of the draining board was changed as described in Table 4. The performance of the system was evaluated in the same manner as in Example 4. The results are shown in Table 4.

TABLE 4

| | External Dimensions of Draining Board (mm) | Contour of Parts Surrounding Through-holes | Height of Parts Surrounding Through-holes (mm) | State of Liquid on Draining Board |
|---|---|---|---|---|
| Example 5 | 300 × 300 × 10 (t) | trapezoid (upper side: 2 mm; lower side: 3 mm) | 2 | B |
| Example 6 | 300 × 300 × 10 (t) | triangle (vertical angle: 60°) | 2 | B |
| Example 7 | 300 × 300 × 10 (t) | hemi-ellipse (major axis: 2 mm; longer axis: 1.6 mm) | 2 | B |

Where the width between through-holes on the upper side of the draining board is 2 mm or smaller as shown in Table 4, little artificial urine remains on the upper surface of the draining board and is smoothly absorbed by the absorbent mat without forming film over the through-holes. As a result, the system emanated no offensive odor.

EXAMPLES 8 TO 10

Sawdust of larch and polyethylene powder (supplied by Nippon Unicar Co., Ltd.; particle size: 0.15 to 0.25 mm; MFR: see Table 5) were mixed in a ratio shown in Table 5, and the mixture was molded into pieces having a diameter of 6.5 mm and a height of 3 to 10 mm by use of a sprout molding machine (die diameter: 6 mm). The dusting ratio and the water absorption of the resulting molded pieces were measured by the methods previously described. The results are shown in Table 5.

TABLE 5

|  | Sawdust (parts by weight) | Polyethylene (parts by weight) | MFR (g/10 min) | Dusting Ratio (%) | Water Absorption (%) |
| --- | --- | --- | --- | --- | --- |
| Example 8 | 9 | 1 | 10 | 0.4 | 6.7 |
| Example 9 | 7 | 3 | 10 | 0.1 | 6.0 |
| Example 10 | 9 | 1 | 100 | 0.7 | 6.7 |

The molded pieces obtained in Examples 8 to 10 were used as litter 4 in the excreta treating system S shown in FIG. 4. The absorbent mat 1 used in the system S was produced by molding a mixture of an absorbing base material mainly comprising pulp, an antimicrobial surface active agent, a binder, and water. In detail, a wood fiber molded product comprising groundwood pulp, corn starch and water (100/10/70) was mixed with 0.2% (based on the wood fiber molded product) of an amphoteric surface active agent (Anhitol 20N, available from Kao Corp.), the mixture was molded into a plate, and the plate was hot-pressed, preliminarily dehydrated, and dried in a drier.

The excreta treating system was evaluated for its performance in terms of handling properties and prevention of offensive odor emanation as follows. The results obtained are shown in Table 6 below.

1) Handling Properties

Three pet owners A, B, and C were asked to have their pet animal get rid of its liquid or solid waste on the excreta treating system for a one week. How many times a day the owner had to exchange the litter was taken as a measure of handling properties.

2) Prevention of Offensive Odor Emanation

During the above-described use by the pet, the strength of the urine odor emanated from the excreta treating system was organoleptically evaluated by the same owner according to the following rating system. The smaller the number of rating, the more the effect in preventing offensive odor emanation.

1 . . . No (odorless)
2 . . . Very slight
3 . . . Slight
4 . . . Moderate
5 . . . Heavy

TABLE 6

| | Number of Times of Litter Exchange (/day) | | | Strength of Odor | | |
| --- | --- | --- | --- | --- | --- | --- |
| Example No. | A | B | C | A | B | C |
| 8 | 1 | 1 | 2 | 2 | 1 | 1 |
| 9 | 1 | 1 | 2 | 2 | 1 | 1 |
| 10 | 1 | 1 | 1 | 2 | 1 | 2 |

As is apparent from the results shown in Tables 5 and 6, the excreta treating system of Examples 8 to 10 are easy to handle and prevent emanation of an offensive urine odor.

As described and demonstrated above, the absorbent mat for excreta treatment according to the present invention has excellent absorptivity for liquid waste such as urine with high deodorizing effect, are easy to handle and dispose of, and can be used for an extended period of time.

The excreta treating system of the present invention prevents pet liquid waste from remaining on the surface and thereby reduces emanation of an offensive odor. The excreta treating material of the present invention, when used as litter of the system, can be used for a prolonged period of time and can be exchanged easily. Use of the excreta treating material secures the prevention of offensive odor emanation.

The pet toilet according to the present invention is convenient and economical to treat both solid and liquid waste from pets.

The invention having been thus described, it will be apparent that the same may be varied in many ways. Such variations are not be regarded as a departure from the spirit and scope of the invention, and all such modifications as would be obvious to one skilled in the art are intended to be included within the scope of the following claims.

What is claimed is:

1. An absorbent mat for excreta treatment having a flat shape and comprising an absorbing base material comprising at least one of plant fiber and pulp, an antimicrobial surface active agent or a combination of a surface active agent and an antimicrobial agent, and at least one of a binder, a crosslinking agent and water, said absorbent mat having a thickness of 3 mm or greater, a bulk density of 0.05 to 0.3 g/cm$^3$, a saturated water absorption of 2 g/1 g or more, and a rate of water absorption of 30 sec or shorter.

2. The absorbent mat according to claim 1, wherein said plant fiber or pulp is groundwood pulp, wastepaper pulp or sawdust, and said fiber plant, said pulp or a mixture thereof is present in an amount of 30 to 95% by weight.

3. The absorbent mat according to claim 1, wherein said antimicrobial surface active agent is a cationic surface active agent or an amphoteric surface active agent, and said antimicrobial surface active agent is present in an amount of 0.1 to 5% by weight.

4. The absorbent mat according to claim 1, wherein said surface active agent is a nonionic surface active agent, said antimicrobial agent is water-soluble, and said surface active agent and said antimicrobial agent are present in an amount of 0.01 to 5% by weight and 0.001 to 5% by weight, respectively.

5. The absorbent mat according to claim 1, wherein said binder is polyvinyl alcohol having a gelatinizing temperature of 60° C. or higher, processed starch having a gelatinizing temperature of 60° C. or higher, or a mixture thereof, and said binder is present in an amount of 1 to 45% by weight.

6. An excreta treating system comprising a draining board, the absorbent mat as set forth in claim 1 which is laid under said draining board, and a tray in which said draining board and said absorbent mat are put.

7. An excreta treating system comprising a draining board and the absorbent mat as set forth in claim 1 which is laid under said draining board, the lower surface of said draining board and the upper surface of said absorbent mat are in close contact with each other.

8. The excreta treating system according to claim 7, wherein said draining board has a large number of through-holes surrounded by parts having a prescribed cross-sectional contour, and the lower surfaces of all the parts surrounding said through-holes are substantially on the same plane.

9. The excreta treating system according to claim 8, wherein the distance between two adjacent through-holes on the upper surface of said draining board is 2 mm or smaller.

10. A method of treating excreta comprising the steps of laying the absorbent mat as set forth in claim 1 under a draining board and then allowing said mat to absorb pet liquid waste having been discharged on said draining board and passed through said draining board.

11. An excreta treating system for pets comprising a draining board, the absorbent mat as set forth in claim 1 which is laid under said draining board, and an excreta treating material put on said draining board, said excreta treating material comprising molded pieces of prescribed shape and having sufficient shape retention not to disintegrate on water absorption.

12. The excreta treating system according to claim 11, wherein said excreta treating material comprises 70 to 97% by weight of a ground material of plant origin and 3 to 30% by weight of a synthetic resin.

13. The excreta treating system according to claim 11, wherein said excreta treating material has a dusting ratio of 5% or less and a water absorption of 3 to 10%.

14. The excreta treating system according to claim 12, wherein said synthetic resin has a melt flow rate of 3 to 200 g/10 min.

15. An excreta treating system for pets comprising:
I. a draining board;
II. an absorbent mat on the draining board, said mat comprising:
   A. an absorbing base material comprising at least one of plant fiber and pulp,
   B. an antimicrobial surface active agent or a combination of a surface active agent and an antimicrobial agent, carried by the base material; and
   C. at least one of a binder, a crosslinking agent and water, said absorbent mat having:
   D. a thickness of 3 mm or greater,
   E. a bulk density of 0.05 to 0.3 g/cm3,
   F. a saturated water absorption capacity of at least two grams of water per gram of base material;
   G. a rate of water absorption of 30 sec or shorter; and
III. an excreta treating material on said mat, said excreta treating material comprising molded pieces of prescribed shape and having sufficient shape retention not to disintegrate on water absorption.

16. The system of claim 15 wherein the antimicrobial agent is organic.

17. The system of claim 15 wherein the surface active agent is nonionic.

18. The system of claim 15 wherein the surface active agent is a member selected from the group consisting of:
   alkyltrimethylammonium chloride,
   dialkyldimethylammonium chloride,
   benzalkonium chloride,
   alkyldimethylaminoactic acid betaine,
   alkyldimethylamine oxide,
   alkylcarboxymethylhydroxyethylimidazolinium betaine, and alkylimidopropyl betaine.

19. The system of claim 15 wherein the surface active agent is nonionic employed in the presence of an antimicrobial agent.

20. The system of claim 15 wherein the surface active agent is selected from the group consisting of:
   glycerol fatty acid esters,
   sorbitan fatty acid esters, and
   polyoxylethylene glycol fatty acid esters, employed in the presence of an antimicrobial agent.

21. The system of claim 15 wherein the surface active agent is employed in the presence of an antimicrobial agent selected from the group consisting of:
   sodium benzoate,
   chloramines T,
   chlorocresol,
   sodium salicylate,
   ethyltrimethyl ammonium bromide,
   potassium sorbate,
   sodium dehydroacetate,
   p-chlorophenol, and
   phenol.

22. The system of claim 15 wherein the binder is a member selected from the group consisting of:
   corn starch
   potato starch
   tapioca starch,
   methyl cellulose, and
   carboxymethyl cellulose.

23. An excreta treating system for pets comprising:
I. a draining board;
II. an absorbent mat on the draining board, said mat comprising:
   A. an absorbing base material comprising at least one of plant fiber and pulp,
   B. an antimicrobial surface active agent carried by the base material;
   wherein said surface active agent is a member selected from the group consisting of:
      alkyltrimethylammonium chloride,
      dialkyldimethylammonium chloride,
      benzalkonium chloride,
      alkyldimethylaminoacetic acid betaine,
      alkyldimethylamine oxide,
      alkylcarboxymethylhydroxyethylimidazolinium betaine, and
      alkylimidopropyl betaine; and
   C. a binder, said absorbent mat having:
   D. a thickness of 3 mm or greater,
   E. a bulk density of 0.05 to 0.3 g/cm3,
   F. a saturated water absorption capacity of at least two grams of water per gram of base material;
   G. a rate of water absorption of 30 sec or shorter; and
III. an excreta treating material on said mat, said excreta treating material comprising molded pieces of prescribed shape and having sufficient shape retention not to disintegrate on water absorption.

24. An excreta treating system for pets comprising:
I. a draining board;
II. an absorbent mat on the draining board, said mat comprising:
   A. an absorbing base material comprising at least one of plant fiber and pulp,
   B. a surface active agent carried by the base material;
   wherein said surface active agent is a member selected from the group consisting of:
      glycerol fatty acid esters,
      sorbitan fatty acid esters, and
      polyoxylethylene glycol fatty acid esters, employed in the presence of an antimicrobial agent selected from the group consisting of:
      sodium benzoate,
      chloramines T,
      chlorocresol, sodium salicylate,
ethyltrimethyl ammonium bromide,
potassium sorbate,
sodium dehydroacetate,
p-chlorophenol, and
phenol; and
C. a binder, said absorbent mat having:
D. a thickness of 3 mm or greater,
E. a bulk density of 0.05 to 0.3 g/cm3,
F. a saturated water absorption capacity of at least two grams of water per gram of base material;
G. a rate of water absorption of 30 sec or shorter; and
III. an excreta treating material on said mat, said excreta treating material comprising molded pieces of prescribed shape and having sufficient shape retention not to disintegrate on water absorption.

* * * * *